United States Patent
Murphy et al.

(10) Patent No.: US 9,696,459 B1
(45) Date of Patent: Jul. 4, 2017

(54) MULTIPURPOSE WEATHER MEASUREMENT INSTRUMENT SENSOR SYSTEM

(75) Inventors: Matthew Murphy, Elkhorn, WI (US); Ryan Torgerson, Burlington, WI (US); Jeffery Bovee, Walworth, WI (US)

(73) Assignee: COMBEX, INC., Lake Geneva, WI (US)

( * ) Notice: Subject to any disclaimer, the term of this patent is extended or adjusted under 35 U.S.C. 154(b) by 1223 days.

(21) Appl. No.: 13/605,225

(22) Filed: Sep. 6, 2012

Related U.S. Application Data

(60) Provisional application No. 61/531,472, filed on Sep. 6, 2011.

(51) Int. Cl.
*G01W 1/00* (2006.01)
*G01W 1/10* (2006.01)

(52) U.S. Cl.
CPC ..................................... *G01W 1/10* (2013.01)

(58) Field of Classification Search
None
See application file for complete search history.

(56) References Cited

U.S. PATENT DOCUMENTS

| | | | | |
|---|---|---|---|---|
| 4,644,786 A | * | 2/1987 | Jacobsen | G01W 1/14 177/94 |
| 8,573,049 B1 | * | 11/2013 | Ware | G01W 1/14 73/170.17 |
| 2006/0017809 A1 | * | 1/2006 | Carroll | G08B 13/19621 348/158 |
| 2011/0217184 A1 | * | 9/2011 | Hipp | F04B 49/06 417/44.1 |
| 2014/0113542 A1 | * | 4/2014 | Foreman | F24F 7/007 454/239 |

OTHER PUBLICATIONS

EPA, Meteorological monitoring guidance for regulatory modeling applications, Feb. 2000, EPA-454/R-99-005, 1-171.*

* cited by examiner

*Primary Examiner* — Aditya Bhat
(74) *Attorney, Agent, or Firm* — Michael Best & Friedrich LLP

(57) ABSTRACT

A multipurpose weather measurement instrument sensor system in which a fan circulates air past temperature and other sensors to ensure their accurate operation, a basin collects rainwater and precisely directs the rainwater into a tipping receptacle to measure the amount of rainwater collected per unit time and a wind speed gauge is provided with a counter-balanced toggle beam to product wobble-free rotation.

9 Claims, 8 Drawing Sheets

MULTIPURPOSE WEATHER MEASUREMENT INSTRUMENT SENSOR SYSTEM

CROSS-REFERENCE TO RELATED PATENT APPLICATIONS

This patent application claims the benefit of U.S. Provisional Patent Application No. 61/531,472, filed Sep. 6, 2011.

FIELD

This invention pertains generally to weather measurement instruments and, more particularly, to unitary multipurpose weather measurement instrument sensor system embodiments which produce accurate and reliable data.

BACKGROUND

Various weather measurement sensors are known for determining wind speed, wind direction, rainfall, humidity, temperature and other weather parameters. A need exists, however, for a unitary weather measurement instrument sensor systems that can accurately and reliably sense multiple weather parameters so that the weather data obtained can be processed by an appropriate apparatus such as a remote weather station receiving the data either wirelessly or over a wired connection.

SUMMARY

Weather measurement instrument sensor embodiments include a temperature sensor, a solar cell to generate an electrical current, and a fan to circulate air in a path past the temperature sensor responsive to the electrical current and to direct the circulated air through openings in the weather measurement instrument. The fan may be configured to circulate the air to counteract solar heating of air within the weather measurement instrument to ensure accurate temperature and other readings.

The weather measurement instrument sensor system may also include humidity and other weather sensors, and the fan may be configured to circulate the air in a path past one or more of these sensors to improve their accuracy and longevity.

The weather measurement instrument sensor system may also include a basin to collect rainwater and direct it through an opening into a tipping receptacle which teeter-totters back and forth indicating the amount of water collected. A user-replaceable screen may be provided to prevent debris from passing through the opening. The device may also include spaced downwardly directed pins to ensure that the water collected in the basin is properly guided to the tipping receptacle in a precise repeatable manner.

The weather measurement instrument may also include a wind speed gauge employing a counterbalanced toggle beam which rotates with the cups of the wind speed gauge to both accurately indicate wind speed and ensure smooth, wobble-free rotation.

BRIEF DESCRIPTION OF THE DRAWINGS

In order to aid in understanding the invention, it will now be described in connection with exemplary embodiments thereof with reference to the accompanying drawings in which like numerical designations will be given to like features with reference to the accompanying drawings wherein.

DETAILED DESCRIPTION

Figure 1:
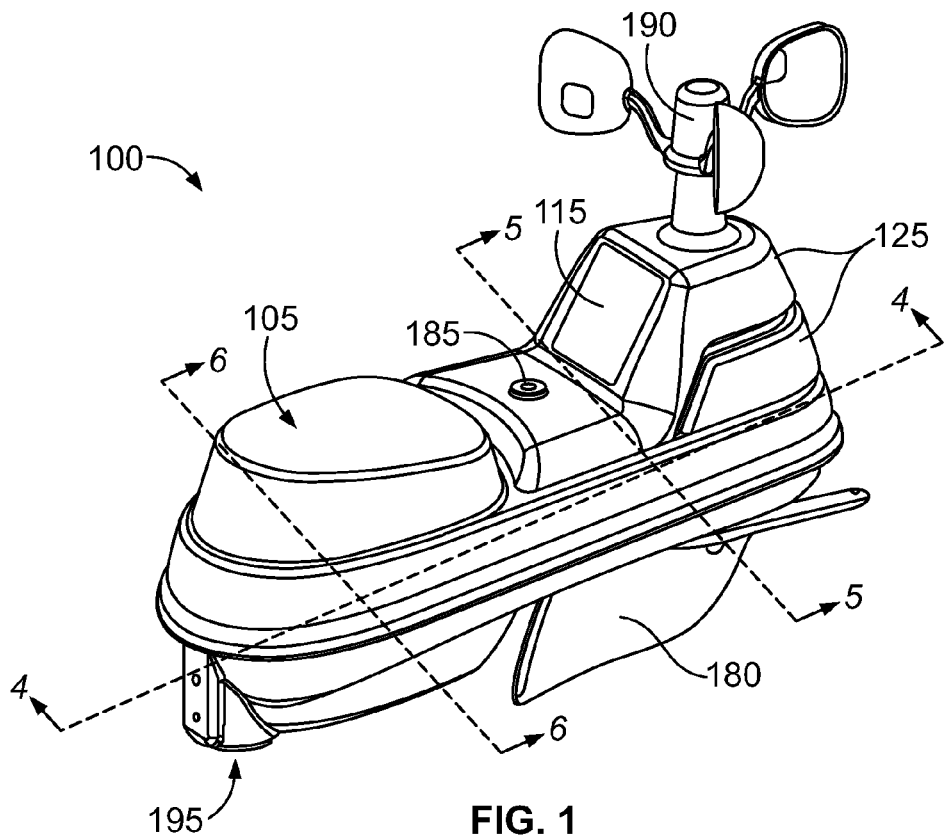
FIG. 1 is a perspective view of a weather measurement instrument sensor system according to one or more aspects of the disclosure.
Figure 2A:
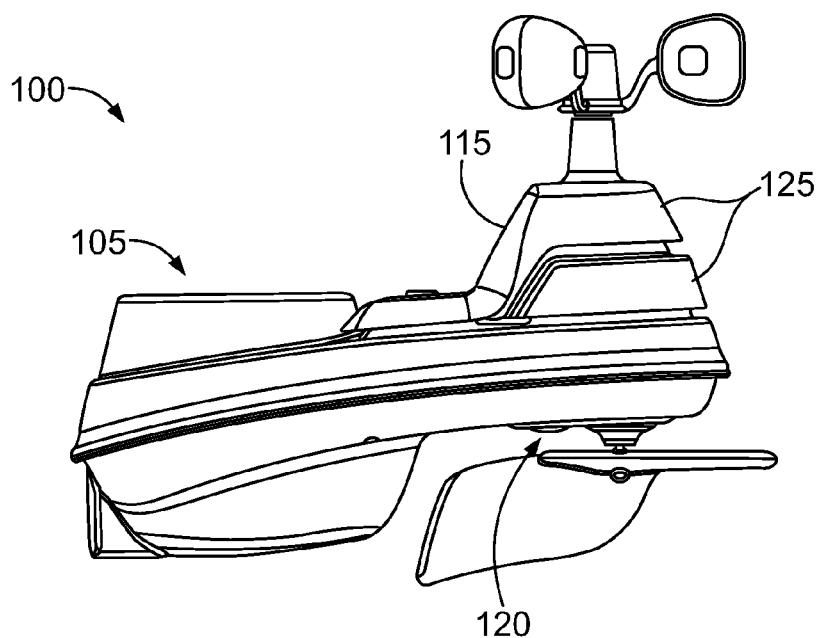
FIGS. 2A, 2B and 2C are respectively side, top view and bottom views of the weather measurement instrument sensor system of FIG. 1.
Figure 2B:
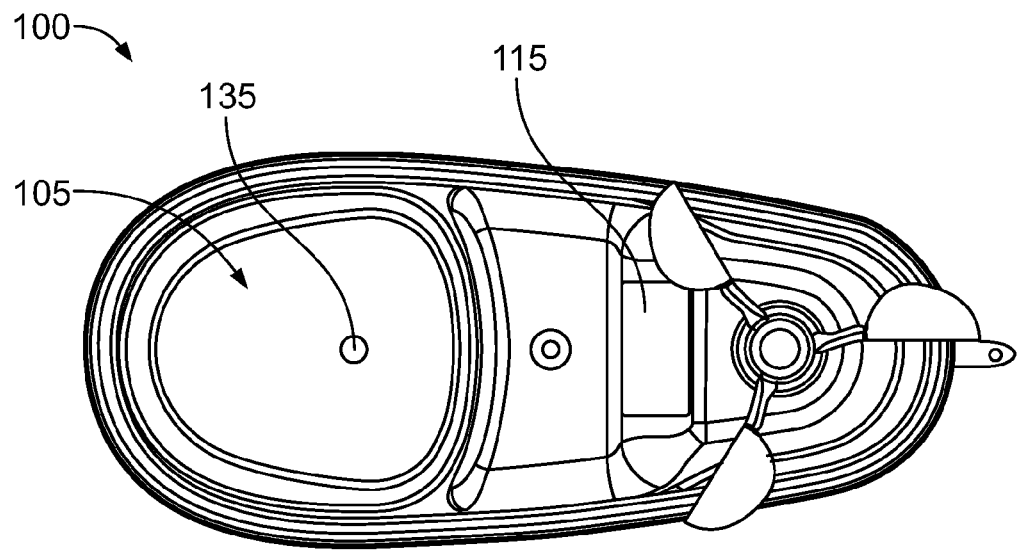
Figure 2C:
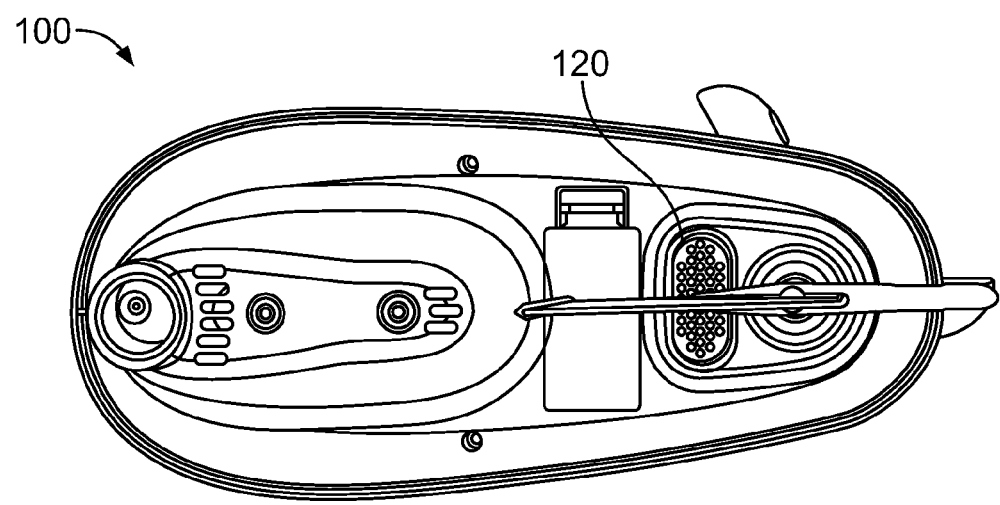

Referring first to FIGS. 1, 2A-C and 3-7, a weather measurement instrument sensor system 100 is shown and includes, among other things, a rain collection basin 105, an opening 110 in the bottom of the collection basin, a solar panel 115, an air intake vent 120, and a housing 125.

Rain collection basin 105 captures and funnels rainwater through opening 110 into spoon members 202 of a tipping receptacle 130. As the escaping water moves through opening 110, it flows down a V-shaped area formed by bottom opposite leveled surfaces 109 of an upstanding wall 121 extending across the opening into the space 111 between a pair of downwardly directed pins 113 located below and across the lower beveled surfaces of wall 121. The surface tension of the water causes it to adhere to and collect between the pins. When the quantity of water collected between the pins is sufficiently heavy to overcome the surface tension, the collected water will drop onto tipping receptacle 130 which is described below. The pins ensure that the quantity of water in each droplet falls from the pins in the same vertical path directly between the pins.

Figure 10:
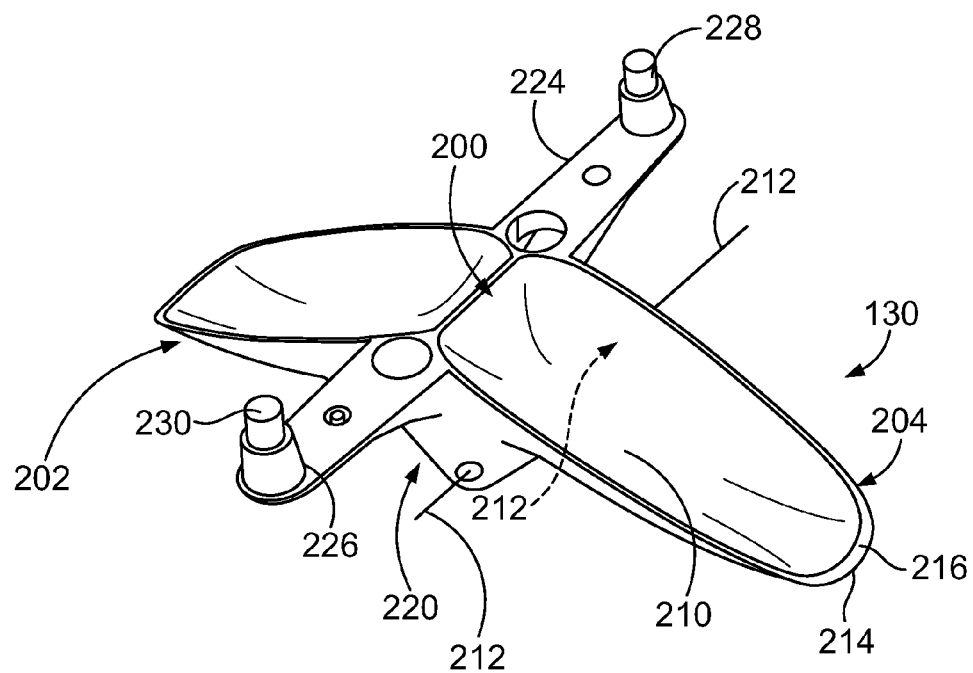
FIG. 10 is a perspective view of a tipping receptacle that may be used in weather instrument sensor system embodiments.
Figure 11:
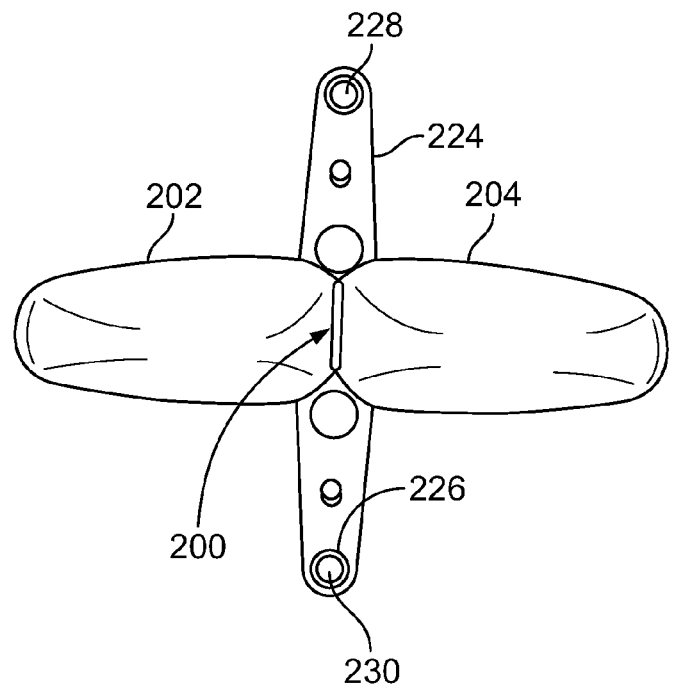
FIG. 11 is a top plan view of the tipping receptacle of FIG. 10.

Tipping receptacle 130 thus comprises a central member 200 and equally sized and equal volume spoon members 202 and 204 projecting from the opposite sides of the central member. The spoon members may be angled downwardly from the central member as can be seen in FIG. 10. The spoon members have rounded bottoms 210 and curved sidewalls 212 and the distal tips 214 of the spoon portions preferably each have a rounded or radiused end 216.

The tipping receptacle includes a support bracket 220 which is pivotally mounted about a pivot axis 222 so that the tipping receptacle can tip back and forth about the pivot axis. Arms 224 and 226 project laterally from the two spoon members and are centered across central member 200. Upstanding magnetic pins 228 and 230 are mounted in and project upwardly from the lateral arms. These magnetic pins move back and forth across a magnetic sensor located above the tipping receptacle (not shown) as the tipping receptacle teeters back and forth about the centrally located pivot axis as each successive spoon member first collects the water received from opening 110, then tips to discharge its collected water. The device thus counts the tips and thereby measures the quantity of water collected by the spoon members to determine the quantity of water passing through the rain collection basin per unit time.

For example, when the weather measurement instrument encounters rainfall of say 0.5 inches per hour, the rain collected at this rate in basin 105 passes through opening 110, and drops from pins 113. The water will drop into the spoon member which is positioned directly below the pins. As this spoon member fills up, it will cause the tipping receptacle to "teeter-totter" down when a predetermined quantity of water is collected. When this happens, magnetic pins 228 and 230 move past the magnetic sensor indicating the collection of the quantity of water necessary to cause the tipping action. As the filled spoon member of the tipping receptacle tips next, the water in that spoon member will readily spill from the radiused end of the spoon member, causing the other spoon member to move under pins 113 whereby the procedure will be repeated so long as water continues to be collected in the collection basin and pass through opening 110. Therefore, in this example, the teeter rate taken with the known volume of the spoon members will indicate a rainfall rate of 0.5 inches/hour.

Figure 8:
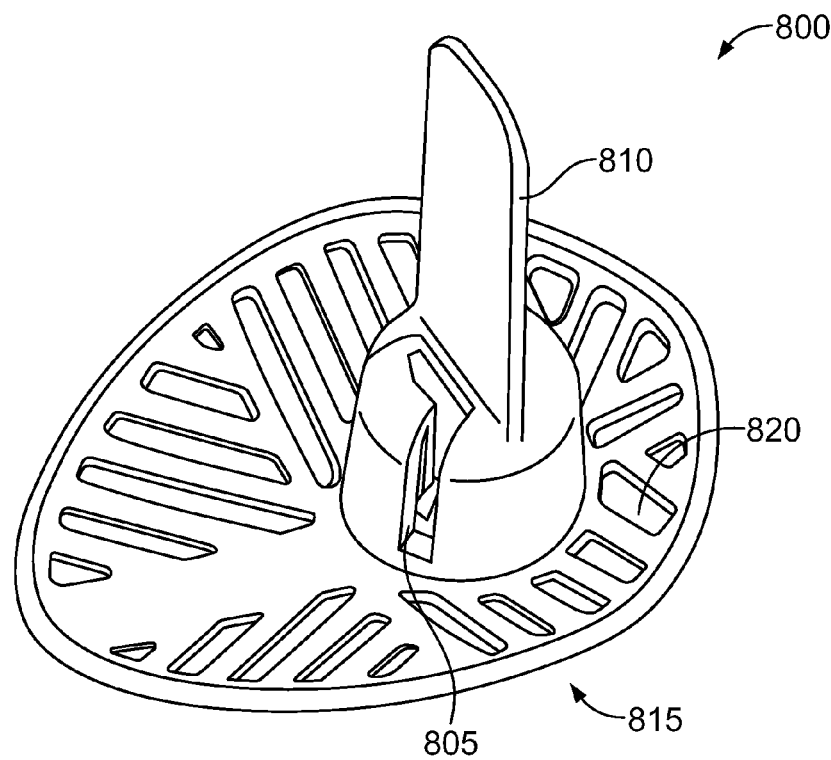
FIG. 8 is a perspective view of the example rain gauge screen of FIGS. 6 and 7.
Figure 9:
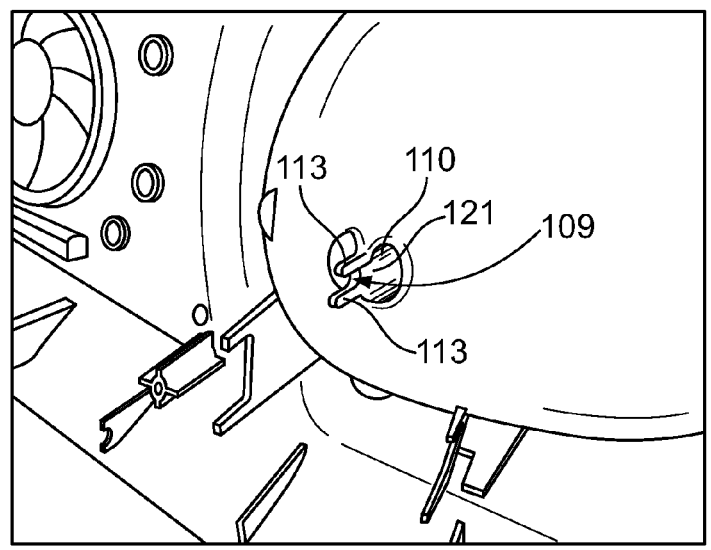
FIG. 9 is partial enlarged view of a pair of downwardly directed pins located below an opening in a rain collection basin of the weather measurement instrument sensor system, the view being taken from below the basin.

Opening 110 of basin 105 includes a stem 135 onto which an optional, user-replaceable and/or user-installable screen 800 can be installed. As shown in FIG. 8, screen 800 includes a catch 805 that selectively engages a lip or catch 140 of stem 135 (see FIG. 7) to secure screen 800 to the weather measurement instrument 100. Screen 800 includes a tab 810 to enable a person to securely grasp the screen 800 when installing and removing it from the weather measurement instrument.

A bottom surface 815 of screen 800 is contoured to substantially correspond to the contour of the bottom portion of rain collection basin 105 in the vicinity of the opening 110. Screen 800 includes openings 820 through which liquid may pass from rain collection basin 105 into the opening 110. While a catch 805 and catch 140 are depicted, other means for securing the screen 800 to the weather measurement instrument 100 may be used. Moreover, screens having other shapes or configurations may be used to prevent debris from passing through opening 110.

Figure 3:
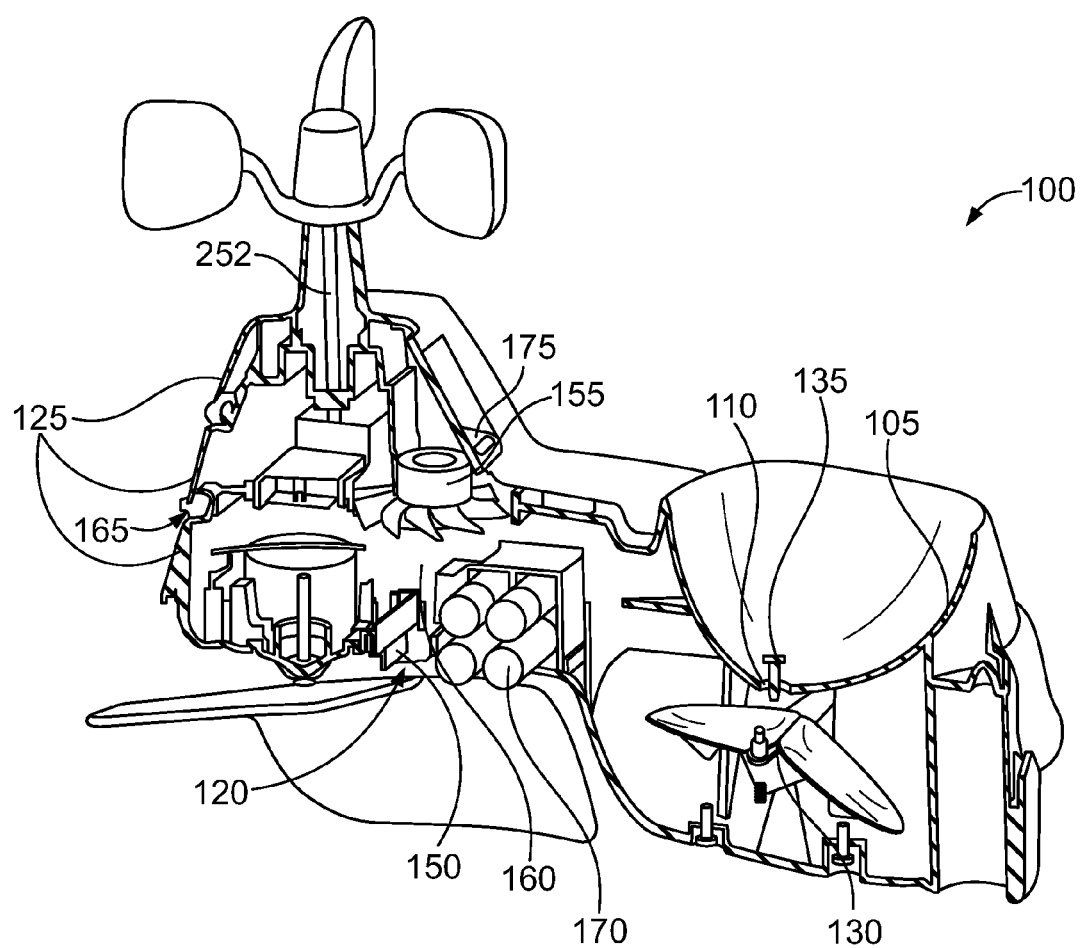
FIG. 3 is a partial cut-away view of the weather measurement instrument sensor system of FIG. 1.
Figure 4:
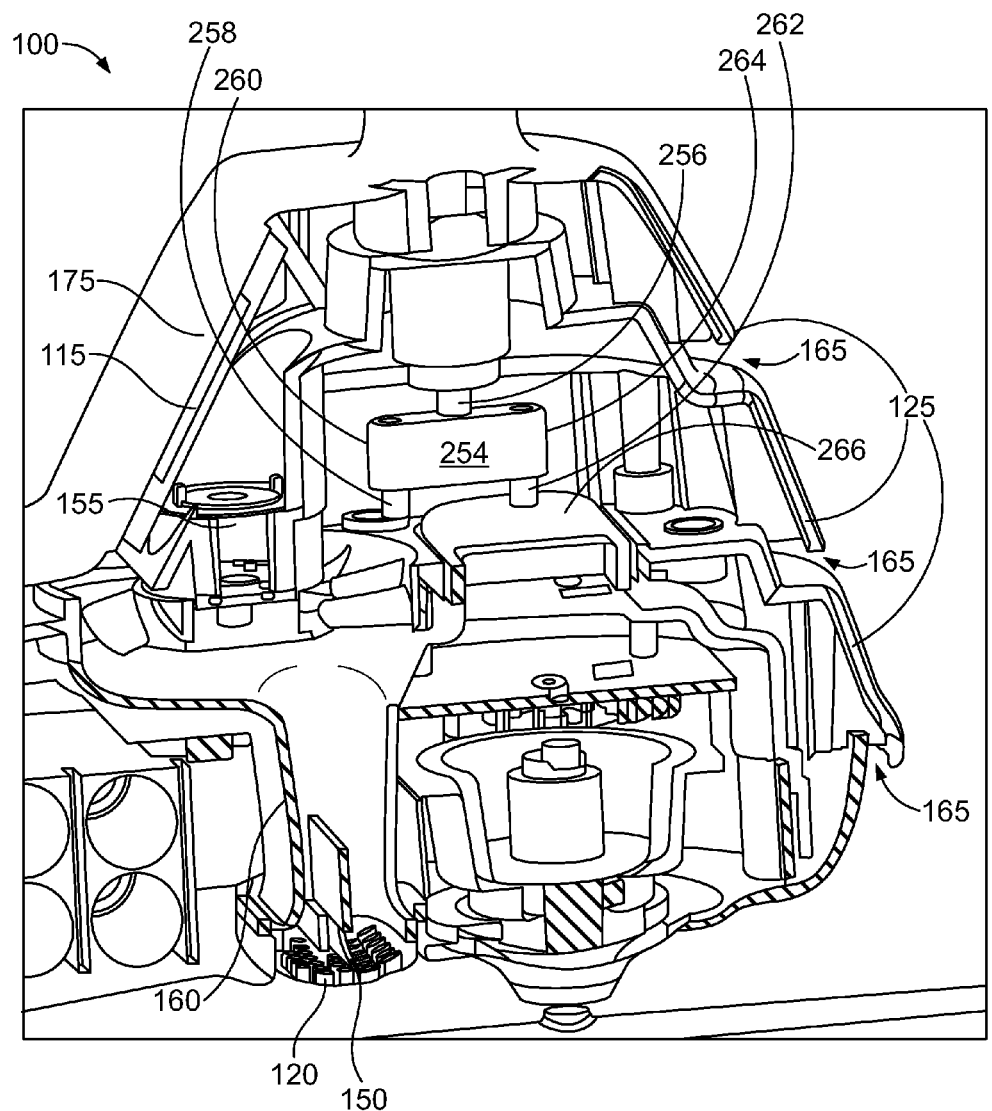
FIGS. 4 and 5 are cross-sectional views of the weather measurement instrument sensor system of FIG. 1.

Air inlet 120 as shown in FIGS. 3 and 4 allows air to be drawn into the weather measurement instrument sensor system 100 and past temperature, humidity, and other sensor(s) 150. Air is drawn into the air inlet 120 and circulated or forced in a stream past the sensor(s) 150 by a fan 155. Were the air not drawn into the air inlet 120 and circulated or forced past the sensor(s) 150 by fan 155, the accuracy of temperature (or humidity and other weather parameters) measured by the sensor(s) 150 may be reduced due to solar heating.

Figure 5:
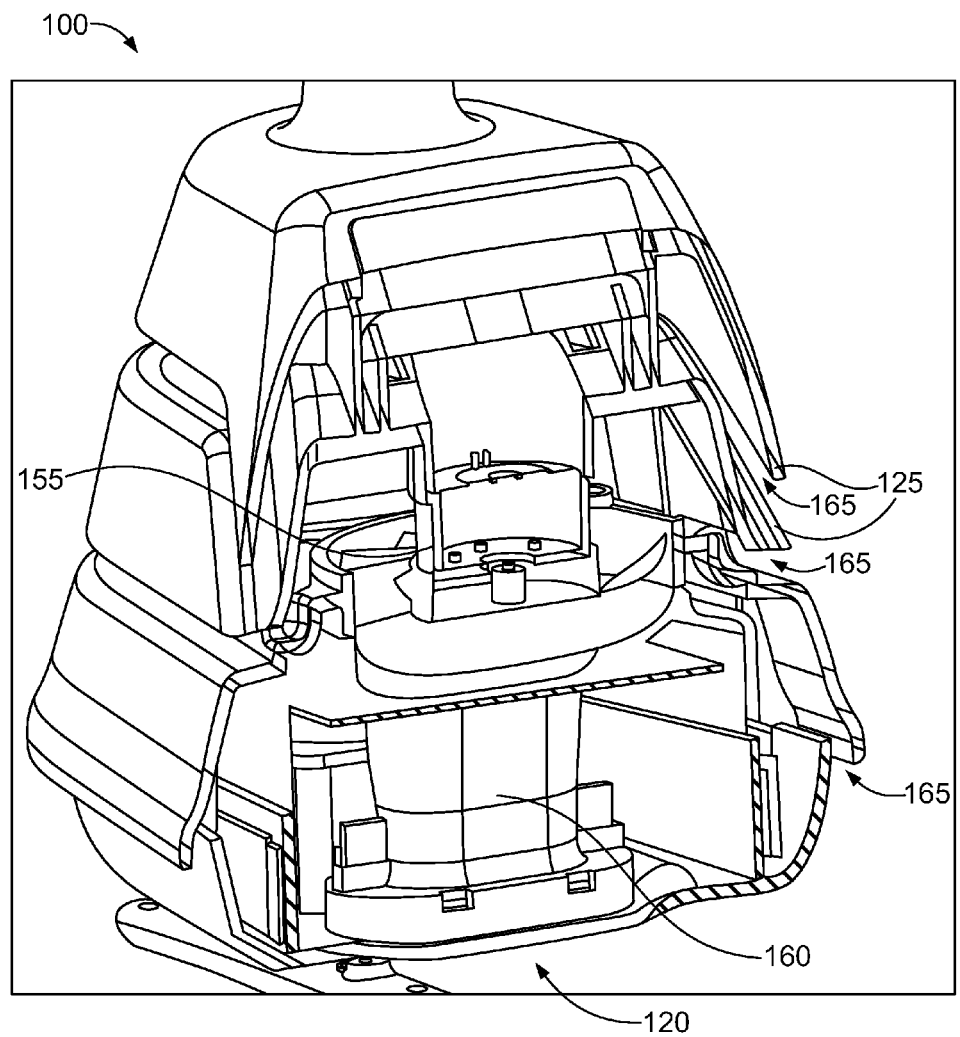
Figure 6:
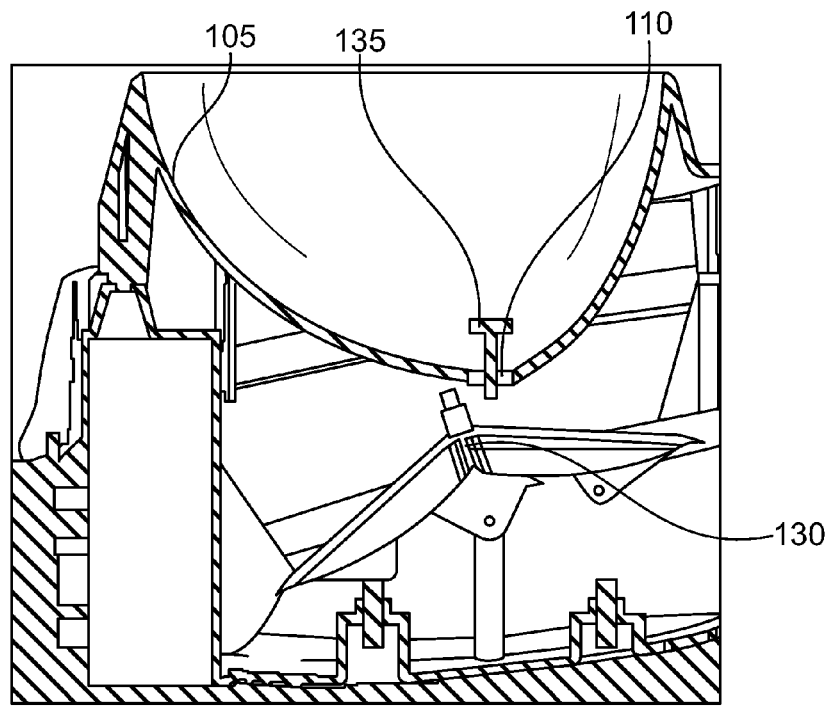
FIG. 6 is another cross-sectional view of the weather measurement instrument sensor system of FIG. 1, including an installed rain gauge screen.
Figure 7:
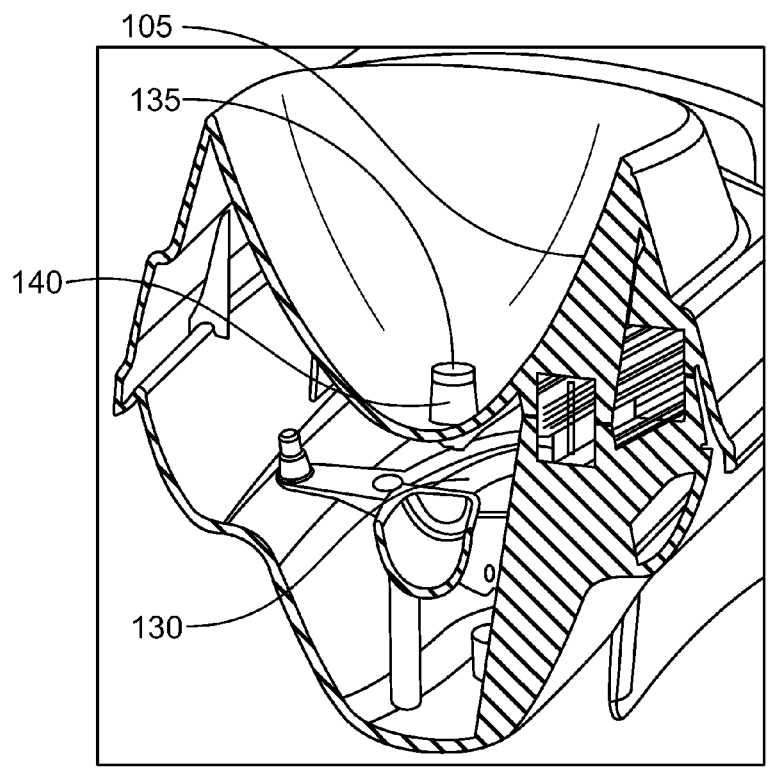
FIG. 7 is another partial cut-away view of the weather measurement instrument sensor system of FIG. 1, including an installed rain gauge screen.

As shown in FIGS. 3-5, air drawn into the air inlet 120 is channeled or directed in a stream past sensor(s) 150 by a duct 160, and then directed, circulated or forced throughout the weather measurement instrument sensor system 100 and out through vents or openings 165 between the parts 125 of the housing. The parts 125 of the housing may be attached via any appropriate means such as screws, snap-together connectors, etc.

Fan 155 is powered by electrical current and/or electrical charge generated by a solar panel 115. Because solar panel 115 can only generate electrical current and/or electrical charge when the sun is shining, fan 155 only operates when the sun is shining, thereby dissipating heated air contained within the weather measurement instrument 100. Alternatively, electrical charge generated by the solar panel 115 could be stored in, for example, a battery or capacitor to provide extended running time for fan 155. Further still, when the sun is shining, solar panel 115 could be used to power other parts of the weather measurement instrument 100 (e.g., the rain sensor 130, the temperature and/or humidity sensors(s) 150, etc.), thus reducing the rate at which user-replaceable batteries 170 are depleted. As best shown in FIG. 4, the solar panel 115 may be placed or installed behind a glass or plastic cover 175 to protect the solar panel 115 from weather, debris, insects and animals.

As shown in FIG. 1, weather measurement instrument sensor system 100 may include any number and/or type of additional or alternative sensors, gauges, etc. such as a wind direction vane 180, a level indicator 185, a wind speed gauge 190 and a mount 195. However, weather measurement instruments embodied in this disclosure are not limited to or by the inclusion of such additional weather measurement means.

For example, a wind speed gauge 190 may be provided including equally spaced radially directed cups 250 mounted to the distal end of a post 252 that is freely rotatable about its longitudinal axis. A toggle beam 254 is attached to and disposed perpendicularly to the proximal end 256 of the post. Toggle beam 254 is as wide as space permits to produce a wide sweep and hence accurate and reliable wind speed data. The beam is counter-balanced by providing it with a downwardly directed magnet 258 adjacent end 260 of the beam and a downwardly directed metal rod 262 adjacent the opposite end 264 of the beam. The magnet and rod, which are fixed in cavities in the beam and equally spaced from the rod, are dimensioned and sized so that they have identical or near identical masses.

Wind speed is determined based on the rate of rotation of magnet 258 of the beam past a magnetic sensor 266 which is associated with appropriate means to determine the rate of rotation on, e.g., a miles per hour basis. Since magnet 258 and rod 262 are spaced an equal distance from the post and are of identical or near identical mass, the beam is counter-balanced to ensure smooth and accurate wobble-free rotation of the post, and hence minimal friction and long life in the wind measurement system.

For the purposes of promoting an understanding of the principles of this disclosure, reference has been made to exemplary embodiments illustrated in the drawings, and specific language has been used to describe embodiments. However, no limitation of the scope of this disclosure is intended by this specific language, and this disclosure encompasses all embodiments that would normally occur to one of ordinary skill in the art.

The particular implementations shown and described herein are illustrative examples, and do not limit the scope of this disclosure in any way. Moreover, no item or component is essential to the disclosed embodiments unless the element is specifically described as "essential" or "critical".

The use of the terms "a" and "an" and "the" and similar referents in the context of describing the disclosed embodiments are to be construed to cover both the singular and the plural. Furthermore, any recitation of ranges of values herein is merely intended to serve as a shorthand method of referring individually to each separate value falling within the range, unless otherwise indicated herein, and each separate value is incorporated into the specification as if it were individually recited herein. Finally, the steps of any methods described herein can be performed in any suitable order unless otherwise indicated herein or otherwise clearly contradicted by context. The use of any and all examples, or exemplary language (e.g., "such as" or "for example") provided herein, is intended merely to better illuminate the embodiments and does not pose a limitation on the scope of this disclosure. Numerous modifications and adaptations will be readily apparent to those skilled in this art without departing from the spirit and scope of this disclosure.

Although certain example methods, apparatuses and articles of manufacture have been described and disclosed herein, the scope of coverage of any patent resulting from this disclosure is not limited thereto. On the contrary, this disclosure encompasses and covers all methods, apparatuses and articles of manufacture fairly falling within the scope of this disclosure.

What is claimed is:

1. A weather measurement instrument sensor system comprising:
   a housing having an air inlet;
   a temperature sensor located within the housing;
   a fan positioned within the housing for drawing outside air into the housing, channeling the outside air past the temperature sensor and circulating the air within the housing; and
   means to power the fan;
   a basin to collect rainwater and funnel the rainwater through an opening;
   a sensor located proximally to the bottom of the basin to measure the rainwater collected in the basin;
   a tipping receptacle positioned opposite the opening, the tipping receptacle having equally sized spoon members which cause the receptacle to teeter-totter back and forth to produce a signal indicative of the amount of water collected in the basin; and
   a pair of downwardly directed pins positioned across the opening for directing the flow of the water from the basin in a vertical path between the pins and onto the tipping receptacle.

2. The weather measurement instrument sensor system of claim 1 including a solar cell to power the fan.

3. The weather measurement instrument of claim 1 also including one or more additional sensors positioned in the path of the moving air chosen from the group consisting of: humidity sensors, barometric pressure sensors, and solar radiation sensors.

4. The weather measurement instrument sensor system of claim 1 including a screen covering the opening to prevent debris from passing through the opening.

5. The weather measurement instrument sensor system of claim 4 in which the screen is user-replaceable.

6. The weather measurement instrument sensor system of claim 4 in which the screen includes a tab to facilitate grasping of the screen.

7. The weather measurement instrument of claim 1 in which the spoon members have radiused ends to facilitate spilling of water from the spoons.

8. The weather measurement instrument sensor system of claim 1 including at least one magnetic pin affixed to the receptacle that moves back and forth past a sensor to indicate the quantity of water collected by the tipping receptacle per unit time.

9. The weather measurement instrument sensor system of claim 1 including a wind speed gauge having equally spaced radially oriented cups mounted to the distal end of a post and a toggle beam attached to and disposed perpendicularly at the proximal end of the post, the toggle beam having a magnetic member adjacent one end of the beam and a counter-balancing member adjacent the opposite end of the beam.

* * * * *